UNITED STATES PATENT OFFICE.

JOSY FLOHR, OF RODANGE, LUXEMBURG, ASSIGNOR TO SOCIETE ANONYME DES HAUTS FOURNEAUX J. FORGES, OF DUDELANGE, LUXEMBURG.

PROCESS OF REFINING IRON.

968,758.

Specification of Letters Patent. Patented Aug. 30, 1910.

No Drawing. Application filed May 20, 1908. Serial No. 433,992.

*To all whom it may concern:*

Be it known that I, JOSY FLOHR, a subject of the Grand Duchy of Luxemburg, residing at Rodange, in the Grand Duchy of Luxemburg, engineer, have invented certain new and useful Improvements in Processes of Refining Iron, of which the following is a specification.

As is well known the separation of the foreign substances from the bath of metal in open hearth processes is effected with the greater difficulty and less rapidly the further the refining progresses because the foreign substances to be eliminated are in a more diluted state, and also the oxidizing power of the slag has decreased. If at this stage a further quantity of ore were added without any other measure being adopted, the fresh ore would be greatly diluted by the resulting slag, and its action would be lessened. The defects of this method of working are sufficiently well known. In existing methods the metal is therefore passed into a second furnace where it is subjected to the action of fresh undiluted ore, thus affording the possibility of getting rid of the slag which has become inert. According to the present method the same result is obtained preferably in this second stage of the process, in the following manner.

When the separation of the foreign substances is observed to proceed with greater difficulty, briquets are introduced into the furnace, which briquets by virtue of their greater specific gravity are able to penetrate through the fluid slag and act upon the foreign substances in the bath.

The briquets may consist chiefly of pure iron oxid with calcium hydroxid (slaked lime) as the binding medium, preference being given to rolling-mill scale, high percentage ore dust and the like. Iron scrap, such as turnings, filings and the like, may also be added to the mixture, and any other suitable binding medium can be substituted for the calcium hydroxid.

The mass must be prepared in such a manner that the briquets, which should be formed under very high pressure, acquire a far higher specific gravity than the fluid slag.

The shape of the briquets should be such that the reacting surface in the iron bath is as large as possible.

The reacting surface of the briquets, which should not be less than 50% of the total surface, will remain the same throughout, because, by reason of their specific gravity, the briquets sink as quickly in the bath of iron as they are consumed by the latter.

The decomposition of the binding medium causes a brisk agitation of the bath, the reaction being thereby still further accelerated.

This method is also applicable to the refining process in electrical furnaces.

The advantages of the method consist chiefly in that the refining is accelerated and the consumption of fuel correspondingly lessened while the output and yield are increased.

In refining phosphoric pig iron, the phosphoric acid content of the slag is increased.

The term "open hearth furnace" occurring in this specification is not confined to the old types of open hearth furnaces which are heated by means of gaseous or carbonaceous fuel. In carrying out my process I may make use of any open hearth furnace electrically heated. Any method of electrical heating may be employed.

Claims.

1. The herein described process of refining iron consisting in treating the molten bath in an open hearth furnace by means of a briqueted mixture containing iron oxids and calcium hydroxid.

2. The herein described process of refining iron, consisting in treating the molten metal by means of a briqueted mixture containing rolling mill scale and calcium hydroxid.

The foregoing specification signed at Luxemburg Grand Duchy this 2d day of May, 1908.

JOSY FLOHR.

In presence of two witnesses—
CHARLES DUMONT,
D. W. CUSTHY.